(12) United States Patent
Han et al.

(10) Patent No.: US 12,254,893 B2
(45) Date of Patent: Mar. 18, 2025

(54) ELECTRONIC DEVICE FOR RECOGNIZING SOUND AND METHOD THEREOF

(71) Applicant: SAMSUNG ELECTRONICS CO., LTD., Suwon-si (KR)

(72) Inventors: Jubum Han, Suwon-si (KR); Hosang Sung, Suwon-si (KR); Yeaseul Song, Suwon-si (KR); Jeonghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 18/107,185

(22) Filed: Feb. 8, 2023

(65) Prior Publication Data

US 2023/0298614 A1  Sep. 21, 2023

Related U.S. Application Data

(63) Continuation of application No. PCT/KR2023/000604, filed on Jan. 12, 2023.

(30) Foreign Application Priority Data

Mar. 16, 2022 (KR) .................. 10-2022-0032999
Sep. 27, 2022 (KR) .................. 10-2022-0122409

(51) Int. Cl.
*G10L 25/51* (2013.01)
*G10L 15/06* (2013.01)
(Continued)

(52) U.S. Cl.
CPC ............ *G10L 25/51* (2013.01); *G10L 15/063* (2013.01); *G10L 21/12* (2013.01); *G10L 21/14* (2013.01);
(Continued)

(58) Field of Classification Search
None
See application file for complete search history.

(56) References Cited

U.S. PATENT DOCUMENTS 10,014,002 B2  7/2018 Koretzky et al.
10,042,038 B1*  8/2018 Lord ...................... G10L 25/51
(Continued)

FOREIGN PATENT DOCUMENTS

CN   113421585   9/2021
CN   113724712   11/2021
(Continued)

OTHER PUBLICATIONS

D. S. Park, W. Chan, Y. Zhang, C.-C. Chiu, B. Zoph, E. D. Cubuk, and Q. V. Le, "SpecAugment: A simple data augmentation method for automatic speech recognition," in Proceedings INTERSPEECH 2019-20th Annual Conference of the International Speech Communication Association, Graz, Austria, Sep. 2019, pp. 2613-2617.
(Continued)

*Primary Examiner* — Kenny H Truong
(74) *Attorney, Agent, or Firm* — Nixon & Vanderhye, P.C.

(57) ABSTRACT

An example sound recognition method may include sampling input sound based on a preset sampling rate; performing Fast Fourier Transform (FFT) on the sampled input sound based on at least one of random FFT numbers or random hop lengths, and generating a two-dimensional (2D) feature map with a time axis and a frequency axis from the sampled input sound on which FFT is performed; training a neural network model, which recognizes sound, with a plurality of 2D feature maps including the first 2D feature map and an $n^{th}$ 2D feature map as training data.

15 Claims, 17 Drawing Sheets

(51) Int. Cl.
*G10L 15/22* (2006.01)
*G10L 21/12* (2013.01)
*G10L 21/14* (2013.01)
*G10L 25/18* (2013.01)
*G10L 25/30* (2013.01)

(52) U.S. Cl.
CPC .............. *G10L 25/18* (2013.01); *G10L 25/30* (2013.01); *G10L 15/22* (2013.01); *G10L 2015/223* (2013.01)

(56) References Cited

U.S. PATENT DOCUMENTS

| | | | |
|---|---|---|---|
| 10,540,988 | B2 | 1/2020 | Lim |
| 11,037,539 | B2 | 6/2021 | Silverstein |
| 11,138,471 | B2 | 10/2021 | Park et al. |
| 11,205,442 | B2 | 12/2021 | Jeong |
| 2018/0276540 | A1 | 9/2018 | Xing |
| 2019/0287550 | A1 | 9/2019 | Lim |
| 2020/0302949 | A1 | 9/2020 | Jeong |
| 2022/0165250 | A1 | 5/2022 | Kang et al. |
| 2022/0238098 | A1 | 7/2022 | Fu et al. |

FOREIGN PATENT DOCUMENTS

| | | |
|---|---|---|
| CN | 113870896 | 12/2021 |
| KR | 10-1843074 | 3/2018 |
| KR | 20190108804 A | 9/2019 |
| KR | 10-2134990 | 7/2020 |
| KR | 20200115731 A | 10/2020 |
| KR | 10-2021-0137502 | 11/2021 |
| KR | 10-2021-0140932 | 11/2021 |
| KR | 10-2358692 | 2/2022 |
| WO | 2020/183256 | 9/2020 |
| WO | 2020/220824 | 11/2020 |
| WO | 2021/075709 | 4/2021 |
| WO | 2021119806 A1 | 6/2021 |

OTHER PUBLICATIONS

Search Report dated Apr. 27, 2023 in International Application No. PCT/KR2023/000604.
Written Opinion dated Apr. 27, 2023 in International Application No. PCT/KR2023/000604.
Extended Search Report dated Jan. 17, 2025 in European Patent Application No. 23770943.1.

* cited by examiner

ELECTRONIC DEVICE FOR RECOGNIZING SOUND AND METHOD THEREOF

CROSS-REFERENCE TO RELATED APPLICATIONS

This application is a continuation of International Application No. PCT/KR2023/000604 designating the United States, filed on Jan. 12, 2023, in the Korean Intellectual Property Receiving Office and claiming priority to Korean Application No. 10-2022-0032999, filed on Mar. 16, 2022, in the Korean Intellectual Property Office, and to Korean Patent Application No. 10-2022-0122409, filed on Sep. 27, 2022, in the Korean Intellectual Property Office, the disclosures of all of which are incorporated by reference herein in their entireties.

BACKGROUND

Field

The disclosure relates to an electronic device for recognizing a type of sound from input sound and a method thereof.

Description of Related Art

An electronic device may process an electronic signal and perform various functions using the processed electronic signal. For example, the electronic device may receive an analog sound signal and convert the analog sound signal into a digital signal. The electronic device may process the digital signal, and transmit the processed digital signal to an external device or convert the processed digital signal into an analog signal and output the analog signal. In addition, the electronic device may recognize the type of sound from a sound signal converted into a digital signal. When the sound is voice, the electronic device may identify the meaning of the voice and generate text based on the identified meaning of the voice. The electronic device may perform a control command based on the identified meaning of the voice or output the generated text in a visual or acoustic manner.

SUMMARY

A sound recognition method according to an embodiment of the disclosure may include sampling input sound based on a preset sampling rate. The sound recognition method may include performing fast Fourier transform (FFT) on the sampled input sound based on at least one of random FFT numbers and random hop lengths, and generating a two-dimensional (2D) feature map with a time axis and a frequency axis from the sampled input sound on which FFT is performed. The generating of the 2D feature map may include transforming the sampled input sound into first FFT data based on at least one of a first FFT number among the random FFT numbers and a first hop length among the random hop lengths, and generating a first 2D feature map including a first feature from the first FFT data. The generating of the 2D feature map may include transforming the sampled input sound into $n^{th}$ FFT data based on at least one of an $n^{th}$ FFT number among the random FFT numbers and an $n^{th}$ hop length among the random hop lengths, and generating an $n^{th}$ 2D feature map including an $n^{th}$ feature from the $n^{th}$ FFT data. The sound recognition method may include training a neural network model, which recognizes sound, with a plurality of 2D feature maps including the first 2D feature map and the $n^{th}$ 2D feature map as training data.

An electronic device according to an embodiment of the disclosure may include an input interface and at least one processor. The at least one processor may be configured to sample sound input through the input interface based on a preset sampling rate. The at least one processor may be configured to perform FFT on the sampled input sound based on at least one of random FFT numbers or random hop lengths, and generate a 2D feature map with a time axis and a frequency axis from the sampled input sound on which FFT is performed. The at least one processor may be configured to transform the sampled input sound into first FFT data based on at least one of a first FFT number among the random FFT numbers and a first hop length among the random hop lengths, and generate a first 2D feature map including a first feature from the first FFT data. The at least one processor may be configured to transform the sampled input sound into $n^{th}$ FFT data based on at least one of an $n^{th}$ FFT number among the random FFT numbers and an $n^{th}$ hop length among the random hop lengths, and generate an $n^{th}$ 2D feature map including an $n^{th}$ feature from the $n^{th}$ FFT data. The at least one processor may be configured to train a neural network model, which recognizes sound, with a plurality of 2D feature maps including the first 2D feature map and the $n^{th}$ 2D feature map as training data.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
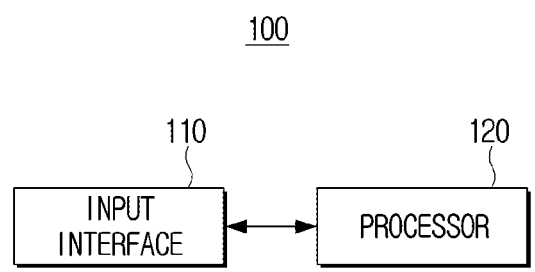
FIG. 1 is a block diagram for describing a configuration of an example electronic device according to various embodiments.

Hereinafter, various embodiments will be described in more detail with reference to the accompanying drawings. Embodiments set forth herein may be variously modified. Certain embodiments are illustrated in the drawings and may be described in detail in the detailed description. However, the embodiments illustrated in the accompanying drawings are only intended to help understanding of various embodiments. Therefore, the technical scope of the disclosure is not limited by the embodiments illustrated in the accompanying drawings and should be understood to include all equivalents or alternatives within the spirit and scope of the disclosure.

Terms, including ordinal numbers such as first and second, may be used to describe various components but these components are not limited by these terms. The terms are only used to distinguish one component from another.

It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof. When a component is referred to as being "coupled to" or "connected" to another component, it should be understood that the component may be directly coupled to or connected to the other component but another component may be interposed therebetween. In contrast, when a component is referred to as being "directly coupled to" or "directly connected" to another component, it should be understood that no component is interposed therebetween.

Meanwhile, the term "module" or "unit", when used to describe components, should be understood as performing at least one function or operation. In addition, the "module" or "unit" may perform a function or operation by hardware, software, or a combination of hardware and software. A plurality of "modules" or a plurality of "units" may be integrated into at least one module, excluding "modules" or "units" that should be performed by certain hardware or at least one processor. As used herein, singular expressions are intended to include plural forms as well, unless the context clearly dictates otherwise.

In the following description of the disclosure, an order of operations should be understood unrestrictedly unless a preceding operation should be performed logically and temporarily prior to a subsequent operation. That is, except in such an exceptional case, the essence of the disclosure will not be changed even when an operation described as a subsequent operation is performed prior to an operation described as a preceding operation, and the scope of the disclosure should be defined regardless of the order of operations. As used herein, the expression "A or B" refers, for example, to not only selectively referring to either A or B but also including both A and B. The term "include" as used herein should be understood as additionally including other components in addition to listed components.

In the present disclosure, only essential components required to describe the disclosure are described and components that are not related to the essence of the disclosure are not described. In addition, the term "include" should not be interpreted as an exclusive meaning including only components described herein, but should be interpreted as a non-exclusive meaning including other components.

In the following description of the disclosure, related well-known functions or components are briefly described or not described when it is determined that they would obscure the subject matter of the disclosure due to unnecessary detail. Meanwhile, embodiments may be independently implemented or operated but may be implemented or operated in combination.

FIG. 1 is a block diagram for describing a configuration of an example electronic device according to various embodiments.

Referring to FIG. 1, an electronic device 100 includes an input interface 110 (e.g., including interface circuitry) and a processor 120 (e.g., including processing circuitry). The electronic device 100 may recognize sound by training a neural network model, which recognizes (or identifies) sound, based on training data and/or using a trained neural network model. Examples of the electronic device 100 may include a server, a cloud, a smart phone, a tablet PC, a navigation device, a slate PC, a wearable device, a digital TV, a desktop computer, a laptop computer, a home appliance, an Internet-of-Things (IoT) device, a kiosk, etc. When the electronic device 100 is a server or a cloud, the electronic device 100 may, for example, train a neural network model to identify sound. When the electronic device 100 is a smart phone, a tablet PC, or the like, the electronic device 100 may, for example, store a trained sound-recognition artificial intelligence (AI) neural network and identify sound using the stored sound-recognition AI neural network. Of course, the disclosure is not limited in this respect.

A control command may be received from a user through the input interface 110. In addition, sound may be received through the input interface 110. For example, the input interface 110 configured to receive a command from a user may be embodied as a keyboard, a button, a keypad, a touch pad, a touch screen, or the like. The input interface 110 configured to receive sound may be embodied as a microphone. When the input interface 110 is embodied as a microphone, sound generated in surroundings may be received through the input interface 110. Alternatively, the input interface 110 may include a communication interface (e.g., including communication circuitry) to communicate with an external device. Sound data may be received from an external device through the input interface 110 including the communication interface. For example, the communication interface may establish communication with an external device through at least one of communication methods such as Wi-Fi, Wi-Fi Direct, Bluetooth, Zigbee, 3rd Generation (3G), 3rd Generation Partnership Project (3GPP), or Long-Term Evolution (LTE). The communication interface may be referred to, for example, as a communication device, a communicator, a communication module, a transceiver, or the like. Alternatively, the input interface 110 may be implemented as an input/output port. In this case, the input/output port may be connected to an external device to receive sound data from the external device. The input interface 110 may be referred to, for example, as an input device, an inputter, an input module, or the like.

The processor 120 may control components of the electronic device 100. The processor 120 may control the input interface 110 to receive sound. The processor 120 may perform Fast Fourier Transform (FFT) on input sound, which is sampled based on a preset sampling rate, based on at least one of random FFT numbers or random hop lengths, and generate a two-dimensional (2D) feature map with a time axis and a frequency axis from the sampled input sound on which FFT is performed.

For example, the processor 120 may perform FFT on the sampled input sound based on a first FFT number and generate a 2D feature map. An FFT number may be a frequency resolution. When the frequency resolution is high (or when an FFT number is large), a resolution of the frequency axis and the size (the amount of data) of a frequency component of the sound data may increase. First_$f$ FFT data obtained by transformation based on a first FFT number may include a resolution of and the amount of data of the frequency axis related to the first_$f$ FFT number. Thus, a first_$f$ 2D feature map generated from the first_$f$ FFT data may include a first_$f$ feature. In addition, the processor 120 may perform FFT on the sampled input sound based on an $n^{th}$ FFT number and generate a 2D feature map. $n^{th}$_$f$ FFT data obtained by transformation based on an $n^{th}$ FFT number may include a resolution of and the amount of data of the frequency axis related to the $n^{th}_{\_f}$ FFT number. Thus, an $n^{th}_{\_f}$ 2D feature map generated from the $n^{th}_{\_f}$ FFT data may include $n^{th}_{\_f}$ feature. Here, n may be a natural number greater than or equal to 2, and the first FFT number and the $n^{th}$ FFT number may be different from each other. For example, an FFT number may be $2^m$, e.g., 4, 8, 16, 32, 64, 128, 256, 1024, 2048 or the like. That is, the FFT number may be a random number.

As described above, the FFT number may be related to the resolution of the frequency component of the sound data. An untrained neural network model cannot determine that the same data with different resolutions are identical to each other. This is because data, a component, a feature or the like included in the same partial region of even the same data may vary according to a resolution. Thus, the neural network model may identify the same data with different resolutions as different types of data, and may be trained to identify the same data with different resolutions as the same data. That is, the electronic device 100 of the disclosure may generate a plurality of 2D feature maps including different features from each other from the same sound data according to an FFT number. The plurality of 2D feature maps including different features from each other may be used as different types of training data for training a neural network model that recognizes sound.

Alternatively, the processor 120 may perform FFT on the sampled input sound based on a random hop length and generate a 2D feature map. The hop length may be understood as the number of pieces of sound data to be hopped (skipped, ignored, or jumped) among all pieces of the sampled sound data. First$_{\_h}$ FFT data obtained by transformation based on a first hop length may include a sound data component on the time axis according to the first hop length. Therefore, a first$_{\_h}$ 2D feature map generated from the first$_{\_h}$ FFT data may include a first$_{\_h}$ feature. In addition, the processor 120 may perform FFT on the sampled input sound based on an $n^{th}$ hop length and generate a 2D feature map. $n^{th}_{\_h}$ FFT data obtained by transformation based on an $n^{th}$ hop length may include a sound data component on the time axis according to an $n^{th}_{\_h}$ hop length. Therefore, an $n^{th}_{\_h}$ 2D feature map generated from the $n^{th}_{\_h}$ FFT data may include an $n^{th}_{\_h}$ feature. Here, n may be a natural number greater than or equal to 2, and the first hop length and the $n^{th}$ hop length may be different from each other. For example, a hop length may be $2^n$, e.g., 4, 8, 16, 32, 64, 128, 256, 1024, 2048 or the like. That is, the hop length may be a random value.

The electronic device 100 of the disclosure may generate a plurality of 2D feature maps including different features from each other from the same sound data according to a hop length. The plurality of 2D feature maps including different features from each other may be used as different types of training data for training a neural network model that recognizes sound.

Alternatively, the processor 120 may perform FFT on the sampled input sound based on a random FFT number and a random hop length, and generate a 2D feature map. First$_{\_fh}$ FFT data obtained by transformation based on the first FFT number and the first hop length may include a resolution of the frequency axis related to the first FFT number and a sound data component on the time axis according to the first hop length. Therefore, a first$_{\_fh}$ 2D feature map generated from the first$_{\_fh}$ FFT data may include a first$_{\_fh}$ feature. In addition, the processor 120 may perform FFT on the sampled input sound based on an $n^{th}$ FFT number and an $n^{th}$ hop length and generate a 2D feature map. $n^{th}_{\_fh}$ FFT data obtained by transformation based on the $n^{th}$ FFT number and the $n^{th}$ hop length may include a resolution of the frequency axis related to the $n^{th}$ FFT number and a sound data component on the time axis according to the $n^{th}$ hop length. Therefore, an $n^{th}_{\_fh}$ 2D feature map generated from the $n^{th}_{\_fh}$ FFT data may include an $n^{th}_{\_fh}$ feature. The FFT number and the hop length may be random values and may be independent of each other. For example, the FFT number may be 1024 and the hop length may be 512.

A method of performing FFT based on at least one of various FFT numbers (e.g., random FFT numbers) and various hop lengths (e.g., random hop lengths) may be referred to as a random FFT method.

The electronic device 100 of the disclosure may generate a plurality of 2D feature maps including different features from each other from the same sound data according to random FFT numbers and/or random hop lengths. The plurality of 2D feature maps including different features from each other may be used as different types of training data for training a neural network model that recognizes sound.

To generate one 2D feature map, the processor 120 may generate a plurality of partial feature maps and connect the partial feature maps to finally generate a 2D feature map.

For example, the processor 120 may perform FFT on a sound part of a first time corresponding to a preset number of samples to generate a first partial feature map. The processor 120 may perform FFT on a sound part of a second time consecutive to the first time and corresponding to the preset number of samples to generate a second partial feature map. In addition, the processor 120 may perform FFT on a sound part of an $n^{th}$ time consecutive to an $(n^{th}-1)$ time and corresponding to a preset number of samples so as to generate an $n^{th}$ partial feature map. The processor 120 may connect the first partial feature map, the second partial feature map, and the $n^{th}$ partial feature map to generate a 2D feature map.

As described above, the processor 120 may generate different feature maps based on the same sound data. For example, the processor 120 may generate different feature maps with different resolutions of a frequency axis by changing an FFT number. The FFT number may be related to a size for representation of data on the frequency axis. In addition, the processor 120 may generate a second 2D feature map by hopping once according to the number of samples corresponding to a hop length. The processor 120 may generate a third 2D feature map by hopping twice according to the number of samples corresponding to the hop length. The processor 120 may generate an $m^{th}$ 2D feature map by hopping $(m-1)$ times according to the number of samples corresponding to the hop length.

The processor 120 may train a neural network model, which recognizes sound, using a generated 2D feature map as training data. A large amount of training data is required to train the neural network model. The electronic device 100 may use a plurality of 2D feature maps, which are generated by hopping the same sound data a plurality of times, as a plurality of pieces of training data.

Alternatively, the processor 120 may generate a plurality of pieces of training data by masking a generated 2D feature map in various ways. For example, the processor 120 may mask a preset region of the 2D feature map. Examples of the masked preset region may include a region of a geometric shape that is long on the time axis, a region of a geometric shape that is long on the frequency axis, a diagonal region with a preset width, a region with a grid pattern, etc. The electronic device 100 may mask the same 2D feature map in various forms and use a result of the masking as a plurality of pieces of training data.

A function related to artificial intelligence according to the disclosure may be performed through the processor 120 and a memory of the electronic device 100.

The electronic device 100 may include one or more processors 120. In this case, the one or more processors 120 may include, but is not limited to, at least one of a central processing unit (CPU), a graphic processing unit (GPU), or a neural processing unit (NPU). For example, when the electronic device 100 includes a plurality of processors 120, a main processor may perform a main operation and an auxiliary processor may perform an operation of assisting the operation of the main processor. Alternatively, one of the plurality of processors 120 may perform a first function and the other may perform a second function. Alternatively, the plurality of processors 120 may process a control sequence in parallel.

A CPU is a general-purpose processor capable of performing artificial intelligence operations as well as general operations, and may efficiently execute complex programs through a multi-layer cache structure. The CPU is advantageous for a serial processing method in which a previous calculation result and a subsequent calculation result may be organically connected to each other through sequential calculations. The general-purpose processor is not limited to the above-described examples unless it is specified as the CPU described above.

The GPU is a processor configured to perform a large amount of calculation, such as floating point operations for graphic processing, in which cores are integrated at a large scale to perform large-scale calculations in parallel. In particular, the GPU may be more advantageous than the CPU in terms of a parallel processing method such as a convolution operation. Alternatively, the GPU may be used as an auxiliary processor to supplement functions of the CPU. The processor configured to perform a large amount of calculation is not limited to the above-described examples unless it is specified as the GPU described above.

The NPU is a processor specialized for AI operations using an AI neural network, and each layer of the AI neural network may be implemented by hardware (e.g., silicon). In this case, the NPU is designed to be specialized according to specifications, e.g., required by a company and thus a degree of freedom thereof is lower than that of the CPU or the GPU but the NPU is capable of efficiently processing artificial intelligence operations, e.g., required by the company. A processor specialized for AI intelligence operations may be embodied in various forms such as a tensor processing unit (TPU), an intelligence processing unit (IPU), and a vision processing unit (VPU). An AI processor is not limited to the above-described examples unless it is specified as the NPU described above.

The one or more processors may be implemented as a system-on chip (SoC). In this case, the SoC may further include a memory and a network interface such as a bus for data communication between the processor and the memory, in addition to one or more processors.

When a SoC included in an electronic device includes a plurality of processors, the electronic device may perform AI-related operations (e.g., operations related to training an AI model or inference) using some of the plurality of processors. For example, the electronic device may perform the AI-related operations using at least one of a GPU, an NPU, a VPU, a TPU or a hardware accelerator specialized for the AI-related operations, such as a convolution operation and a matrix multiplication operation, among the plurality of processors. However, the above description is only an example and the AI-related operations may be processed using a general-purpose processor such as a CPU.

In addition, the electronic device may perform the AI-related operations using a multi-core (e.g., a dual-core, a quad-core or the like) included in one processor. In particular, the electronic device may perform the AI-related operations such as a convolution operation and a matrix multiplication operation in parallel using the multi-core included in the processor.

The one or more processors control input data to be processed according to a predefined operation rule stored in the memory or using an AI model. The predefined operation rule or the AI model may be provided through learning.

Here, the providing of the predefined operation rule of the AI model through learning may be understood to refer, for example, to predefined operation rules or an AI corresponding to desired features that are obtained by applying a learning algorithm to a plurality of pieces of training data. Such learning may be made by a device that performs AI according to the disclosure or by a separate server/system.

The artificial intelligence model may include a plurality of neural network layers. At least one weight value is assigned to at least one layer, and an operation of the at least one layer is performed through a result of an operation of a previous layer and at least one defined operation. Examples of a neural network of the disclosure include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep Q-Networks, and a transformer, but are not limited thereto unless specified otherwise.

The learning algorithm is a method of training a target device (e.g., a robot) using a plurality of pieces of training data such that the target device may make decisions or predictions by itself. Examples of the learning algorithm may include supervised learning, unsupervised learning, semi-supervised learning, or reinforcement learning but are not limited thereto unless specified otherwise.

A 2D feature map as described above may include a time axis and a frequency axis. A resolution of the frequency axis of the 2D feature map may be determined by a preset number of samples. A resolution of the time axis of the 2D feature map may be determined by a random hop length. A feature map will be described in detail below.

The processor 120 may recognize sound using a trained neural network model. For example, the processor 120 may receive sound (or sound data) through the input interface 110. The processor 120 may generate a 2D feature map from the input sound in a manner similar to the above-described process. The processor 120 may recognize sound from a 2D feature map generated using a trained neural network model. That is, the processor 120 may identify the type of sound and a place in which the sound has occurred. For example, the processor 120 may identify the type of sound, e.g., human voice, a baby's cry, car sound, dog barking, wind sound or the like, and identify a place in which the sound has occurred, e.g., downtown, forest or beach.

Figure 2:
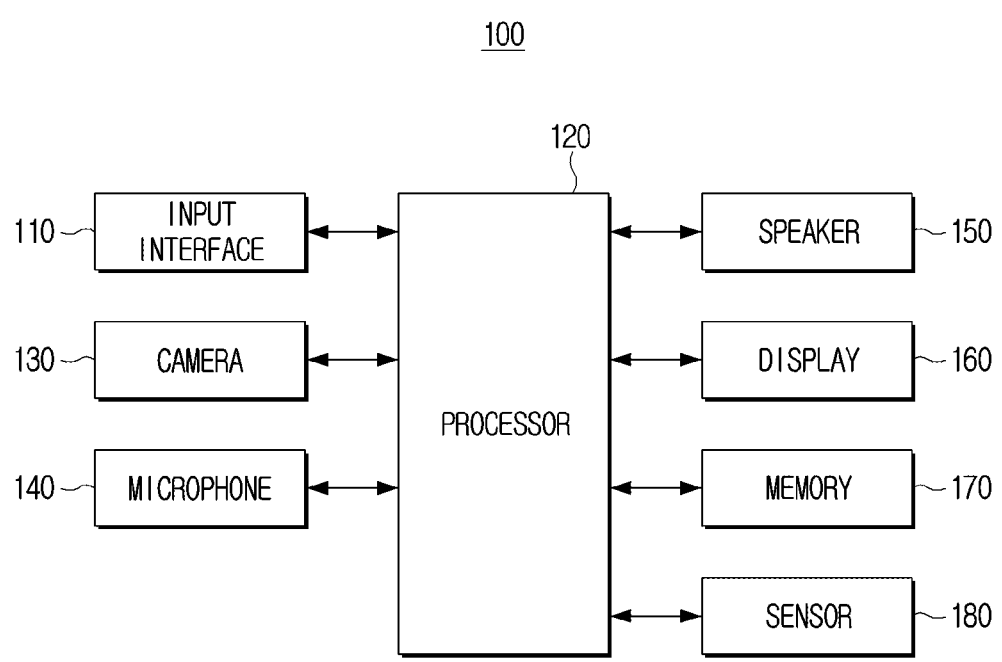
FIG. 2 is a detailed block diagram for describing a configuration of an example electronic device according to various embodiments.

FIG. 2 is a detailed block diagram for describing a configuration of an example electronic device according to various embodiments.

Referring to FIG. 2, an electronic device 100 may include an input interface 110, a processor 120, a camera 130, a microphone 140, a speaker 150, a display 160, a memory 170, and a sensor 180. The input interface 110 is as described above with reference to FIG. 1 and thus a detailed description thereof will not be repeated.

The camera 130 may photograph surroundings of the electronic device 100. Alternatively, the camera 130 may photograph a user's facial expression, motion, gaze, etc. The processor 120 may perform a control operation based on information of a photographed surrounding area or information about the user. Examples of the camera 130 may include a charge-coupled device (CCD) sensor and a complementary metal-oxide semiconductor (CMOS) sensor. Examples of the camera 130 may include an RGB camera and a depth camera.

Sound of surroundings may be received through the microphone 140. In addition, a user's voice may be received through the microphone 140. The processor 120 may identify the type of input sound based on the input sound. Alternatively, the processor 120 may recognize a control command based on a user's input voice and perform a control operation corresponding to the recognized control command.

The speaker 150 outputs a sound signal obtained by performing signal processing. For example, the speaker 150 may output information about the identified type of the sound in the form of voice. In addition, the speaker 150 may output a user's input command, information related to a state or operation of the electronic device 100 or the like in the form of voice or notification sound.

The display 160 may display information visually. For example, the display 160 may display the information about the identified type of the sound. For example, the display 160 may be implemented as a liquid crystal display (LCD), an organic light-emitting diode (OLED), a touch screen, or the like. When the display 160 is implemented as a touch screen, the electronic device 100 may receive a control command through the touch screen.

The memory 170 may store data, algorithms, and the like for performing functions of the electronic device 100, and store a program, commands, and the like to be executed by the electronic device 100. For example, the memory 170 may store a trained neural network model. The algorithm, data, and the like stored in the memory 170 may be loaded into the processor 120 to perform data processing thereon, under the control of the processor 120. That is, the trained neural network model may be loaded into the processor 120 to identify the type of input sound. For example, the memory 170 may be implemented as a type of memory such as a read-only memory (ROM), a random access memory (RAM), a hard disc drive (HDD), a solid-state driver (SSD), or a memory card.

The sensor 180 may detect information related to a user or a surrounding environment. The processor 120 may perform a control operation based on the detected information. Examples of the sensor 180 may include an image sensor, a tracking sensor, an angle sensor, an acceleration sensor, a gravity sensor, a gyro sensor, a geomagnetic sensor, a direction sensor, a motion recognition sensor, a proximity sensor, a voltmeter, an ammeter, a barometer, a hygrometer, a thermometer, an illuminance sensor, a heat sensor, a touch sensor, an infrared sensor, an ultrasonic sensor, etc.

The electronic device 100 may include all or some of the components described above. The electronic device 100 may further include other components for performing various functions in addition to the above-described components.

A process of generating a 2D feature map will be described in detail below.

Figure 3:
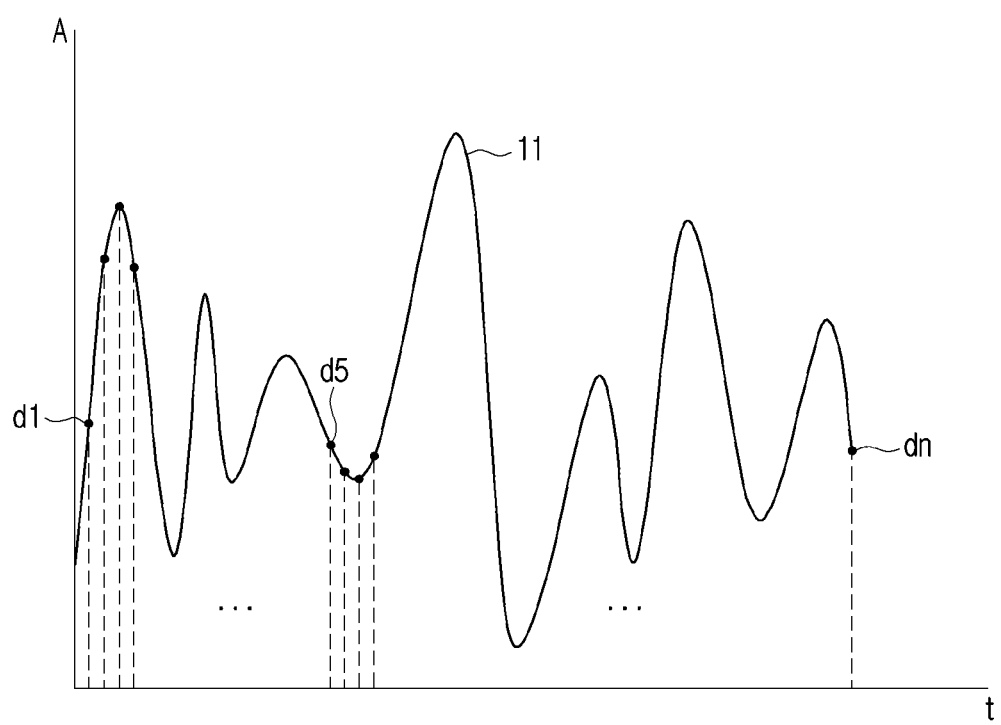
FIG. 3 is a diagram for describing an example process of sampling input sound according to various embodiments.

FIG. 3 is a diagram illustrating an example process of sampling input sound according to various embodiments.

FIG. 3 illustrates a waveform 11 of sound. Sound input through a microphone may be an analog signal. The electronic device 100 may convert the analog signal into a digital signal to process the input sound. The electronic device 100 may sample the input sound based on a preset sampling rate. For example, when the sampling rate is 16 kHz, the electronic device 100 may sample 16,000 pieces of data per second. That is, the electronic device 100 may sample a piece of data at an interval of 62.5 us. As shown in FIG. 3, the electronic device 100 may sample a plurality of pieces of data, including first data d1, fifth data d5, and $n^{th}$ data dn.

The electronic device 100 may perform FFT on sampling data and generate a 2D feature map based on the sampling data on which FFT is performed.

Figure 4:
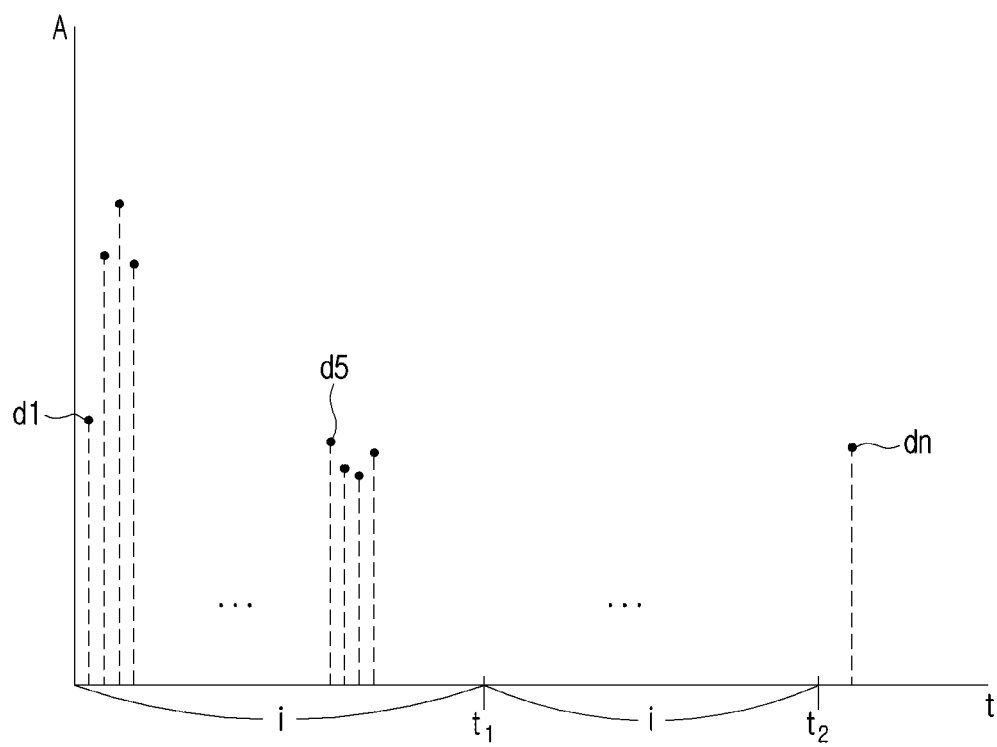
FIGS. 4, 5, and 6 are diagrams for describing an example process of generating a two-dimensional (2D) feature map according to various embodiments.
Figure 4:
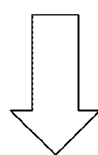
Figure 4:
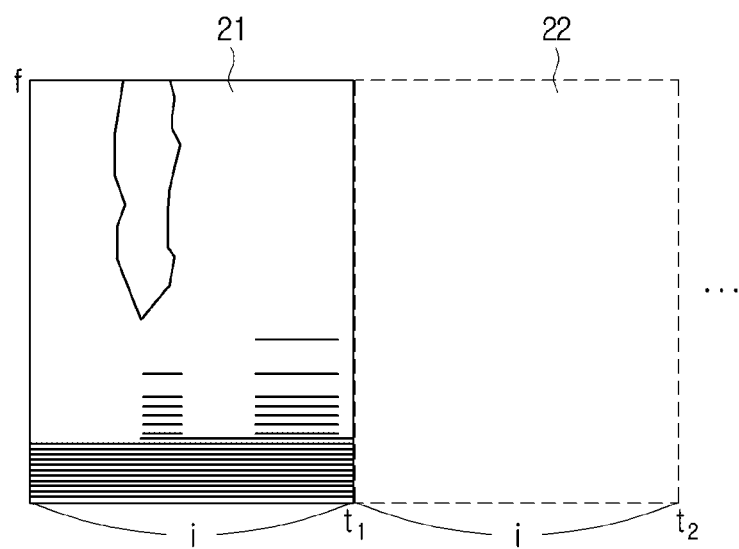
Figure 5:
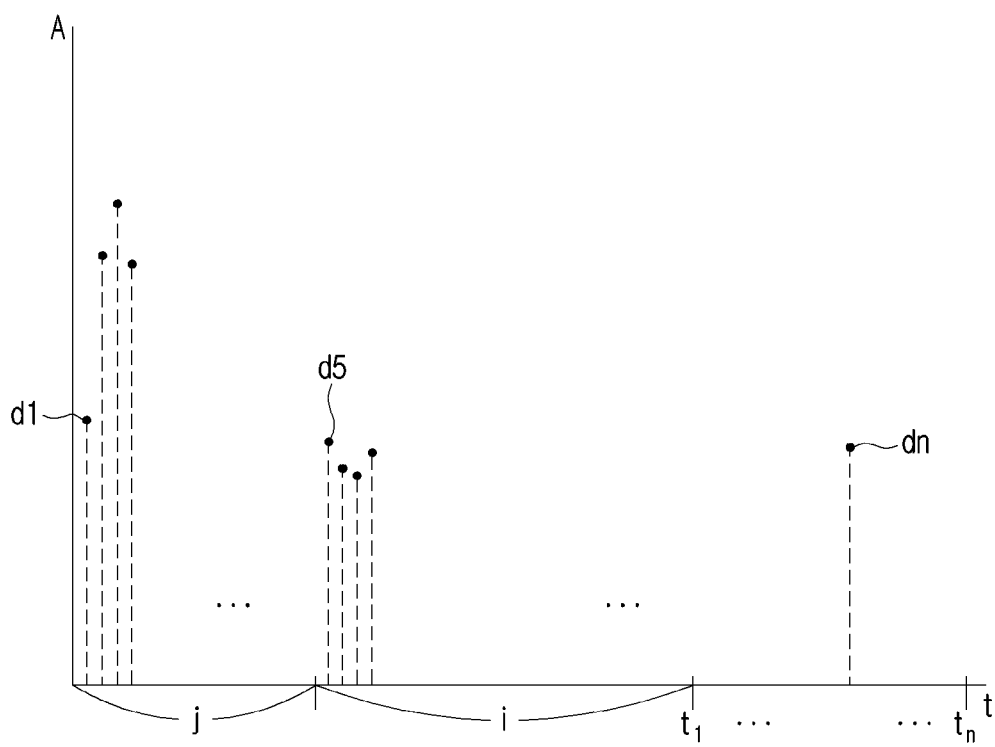
Figure 5:
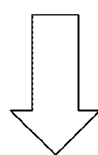
Figure 5:
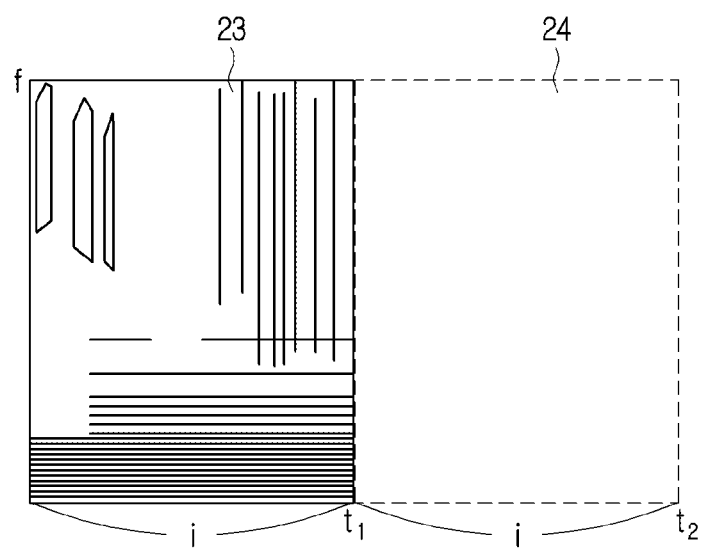
Figure 6:
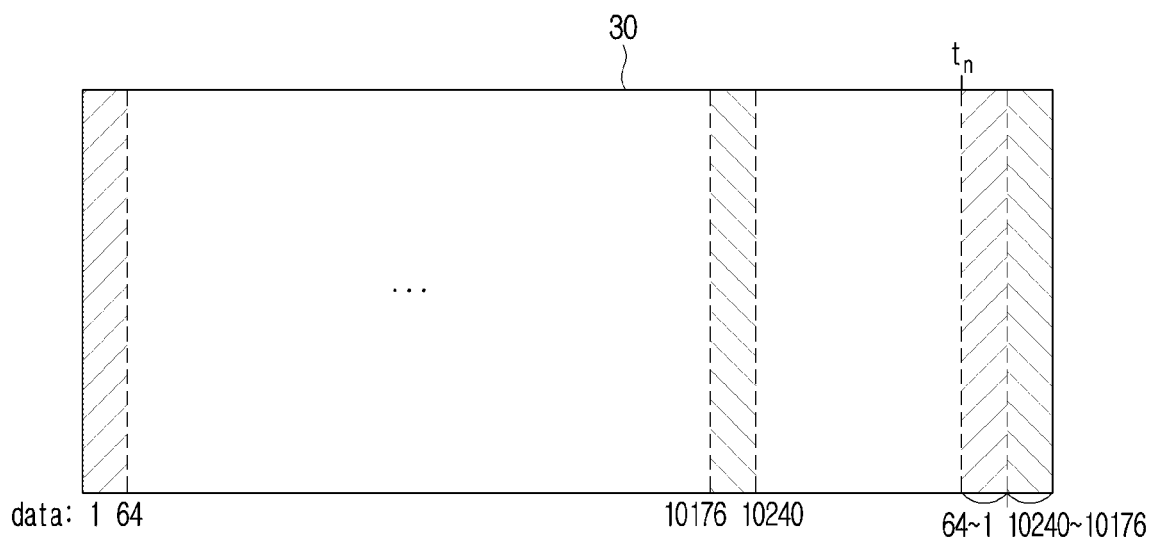

FIGS. 4, 5, and 6 are diagrams for describing a process of generating a 2D feature map according to various embodiments.

FIG. 4 illustrates sampling data and a 2D feature map. As described above with reference to FIG. 3, the electronic device 100 may sample input sound at a preset sampling rate to obtain a plurality of pieces of data, including first data d1, fifth data d5, and $n^{th}$ data dn. In addition, the electronic device 100 may perform FFT on sampled sound data to generate a 2D feature map. The 2D feature map may be a spectrum map of the sound data. An X-axis of the 2D feature map may be a time component, and a Y-axis thereof may be a frequency component. That is, the 2D feature map may represent a frequency component f in which sound data is included according to time t.

In the 2D feature map, a resolution of the frequency axis may be determined by a random FFT number. For example, when the sampling rate is 16 kHz, data obtained by performing FFT may be represented as 8 kHz, which is 0.5 times the sampling rate, according to the Nyquist theorem. When the FFT number is 512, the electronic device 100 may process a frequency band of 8 kHz by dividing it into 257 (512/2+1) regions. When the FFT number is 2048, the electronic device 100 may process the frequency band of 8 kHz by dividing it into 1025 (2048/2+1) regions. As the FFT number is increased, the resolution of the frequency axis may increase and the magnitude of a frequency component of the sound data may increase. Accordingly, the electronic device 100 may determine the amount of data on the frequency axis of the 2D feature map according to the FFT number and change the resolution of the frequency axis by changing the FFT number.

The electronic device 100 may perform FFT by dividing the sampled sound data into a plurality of regions to generate partial feature maps. Thereafter, an entire 2D feature map may be generated by connecting the generated partial feature maps.

In FIG. 4, i may denote a preset number of samples. For example, when the preset number of samples is 1024, the electronic device 100 may perform FFT on 1024 pieces of sound data to generate a first partial feature map 21. When a sampling rate is 16 kHz, a sampling time interval is 62.5 us and thus t1 may be about 75.2 ms. That is, in the above-described example, the electronic device 100 may generate the first partial feature map 21 based on 1024 pieces of sound data from a time period of 0 to 75.2 ms. Thereafter, the electronic device 100 may generate a second partial feature map 22 based on 1024 pieces of sound data from a time period of 75.2 ms to 150.4 ms. The electronic device 100 may connect the second partial feature map 22 to the first partial feature map 21. In the disclosure, the term "connection" may be understood, for example, as sequentially arranging generated feature maps. The electronic device 100 may repeatedly perform the above-described process to generate an $n^{th}$ partial feature map corresponding to the sound data until $n^{th}$ time and connect the $n^{th}$ partial feature map to an (n−1)th partial feature map. That is, the electronic device 100 may generate an entire 2D feature map by connecting the first partial feature map 21, . . . , and the $n^{th}$ partial feature map to one another.

In this case, when the FFT number is 512, the electronic device 100 may process a frequency band of 8 kHz by dividing it into 257 regions (or 257 resolutions). The electronic device 100 may generate a first 2D feature map including a first feature through the above-described process. In addition, the electronic device 100 may generate other 2D feature maps through the same process while changing the FFT number. For example, the electronic device 100 may change the FFT number to 1024. When the FFT number is 1024, the electronic device 100 may process a frequency band of 8 kHz by dividing it into 513 regions (or 513 resolutions). The electronic device 100 may generate partial feature maps based on the 513 resolutions and connect the generated partial feature maps to generate a second 2D feature map including a second feature. The electronic device 100 may change the FFT number to 2048. When the FFT number is 2048, the electronic device 100 may process a frequency band of 8 kHz by dividing it into 1025 regions (or 1025 resolutions). The electronic device 100 may generate partial feature maps based on the 1025 resolutions and connect the generated partial feature maps to generate a third 2D feature map including a third feature. The above-described resolutions are only examples for describing a difference of a resolution according to an FFT number and should not be understood as actual resolutions.

The generated 2D feature maps may be used as training data of a neural network model for sound recognition. The electronic device 100 may train a neural network model, for sound recognition, using a 2D feature map of sound data, a result value of which is known. Alternatively, the electronic device 100 may recognize sound using a neural network model trained based on a generated 2D feature map. The electronic device 100 may recognize sound using a neural network model trained based on a 2D feature map of sound data. For example, the recognition of the sound may be understood, for example, as recognizing the type of the sound and the place in which the sound has occurred.

FIG. 5 illustrates sampling data and a 2D feature map. The sampling data shown in FIG. 5 is the same as that shown in FIG. 4. That is, sound data of FIG. 5 is the same as that of FIG. 4.

As described above with reference to FIG. 4, the electronic device 100 may perform FFT on sampled sound data by dividing the sampled sound data into a plurality of areas, and generating partial feature maps. Thereafter, a whole 2D feature map may be generated by connecting the generated partial feature maps.

However, FIG. 5 illustrates a process of generating a 2D feature map by applying a hop length. In FIG. 5, j may denote a hop length. For example, when a preset number i of samples is 1024 and a hop length j is 512, the electronic device 100 may hop 512 pieces of sound data and generate a first partial feature map 23 from 1024 pieces of sound data starting from a 513th piece of sound data. Because a sampling time interval is 62.5 us, the first partial feature map 23 may be generated based on 1024 pieces of sound data for a time period of 32 ms to 107.2 ms. As described above with reference to FIG. 4, the electronic device 100 may generate a second partial feature map 24 based on 1024 pieces of data for a time period of 107.2 ms to 182.4 ms time. The electronic device 100 may connect the second partial feature map 24 to the first partial feature map 23. That is, the electronic device 100 may generate an entire 2D feature map by connecting the first partial feature map 23, . . . , and an $n^{th}$ partial feature map to one another. The generated 2D feature map of FIG. 5 is generated based on the same sound data as the generated 2D feature map of FIG. 4 but may include different features from the features of the 2D feature map of FIG. 4.

The electronic device 100 may change the hop length j. When the hop length j is 1024, the electronic device 100 may hop 1024 pieces of sound data and generate a second 2D feature map starting from a 1025th piece of the sound data. When the hop length j is 2048, the electronic device 100 may hop 2048 pieces of sound data and generate a third 2D feature map starting from a $2049^{th}$ piece of the sound data. That is, the electronic device 100 may generate a plurality of 2D feature maps including different features from each other from the same input sound data according to a random hop length of 2n. In addition, the electronic device 100 may generate a plurality of 2D feature maps by applying all of random FFT numbers and random hop lengths. Accordingly, the electronic device 100 may generate various types of training data for training a neural network model based on the same sound data.

Alternatively, the electronic device 100 may generate other 2D feature maps based on the number of hoppings based on the hop length j. For example, the electronic device 100 may generate feature maps starting from the $1025^{th}$ piece of sound data by hopping twice by the hop length j. Therefore, the electronic device 100 may generate m 2D feature maps by hopping a sample of the sound data m times by the hop length j.

In the 2D feature map, a resolution of a time axis may be determined by a hop length and/or the number of hoppings. For example, the number of pieces of sampled input data may be 4096, and the preset number i of samples for generating partial feature maps may be 1024. The electronic device 100 may generate four partial feature maps from the sampled input data. The electronic device 100 may generate three partial feature maps when the hop length is 1024. The electronic device 100 may generate two partial feature maps when the hop length is 2048. The electronic device 100 may generate three partial feature maps when the hop length is 1024 and hopping is performed once. The electronic device 100 may generate two partial feature maps when the hop length is 1024 and hopping is performed twice. Accordingly, the electronic device 100 may change a resolution of the time axis with respect to the same sampled input data according to the hop length and/or the number of hoppings. That is, the electronic device 100 may change a resolution of a time axis of a 2D feature map based on the hop length and/or the number of hoppings.

Meanwhile, a last partial feature map may include a portion of the sound data according to the number of pieces of the sampled input data, the preset number of samples, and the hop length.

FIG. 6 is a diagram for describing an example process of generating a last partial feature map according to various embodiments.

FIG. 6 illustrates a 2D feature map 30 obtained by connecting partial feature maps to each other. A last piece of data of sampled input data may be data sampled at a point in time tn. Accordingly, no data may be input after the point in time tn of the last partial feature map. The electronic device 100 may pad a certain value (e.g., zero-padding) to a region after the point in time tn when data is not input. For example, the electronic device 100 may pad zero to a region of the last partial feature map after the point in time tn.

Alternatively, as shown in FIG. 6, the electronic device 100 may copy data of certain regions of input data. For example, when the last feature map is short of 128 pieces of data, the electronic device 100 may connect 64 pieces of initial data and 64 pieces of data immediately before the last partial feature map to the region after the point in time tn. In this case, the electronic device may connect the copied data of the regions to each other in reverse order (backward direction). As shown in FIG. 6, the electronic device 100 may connect first to $64^{th}$ pieces of data in reverse order, starting from the $64^{th}$ piece of the data, and connect 10176th to $10240^{th}$ pieces of the data in reverse order starting from the $10240^{th}$ piece of the data.

Meanwhile, the electronic device 100 may mask a generated 2D feature map in various patterns to generate various types of training data.

FIGS. 7A, 7B, 7C, 7D, 7E, 7F, and 7G are diagrams for describing a masking pattern according to an embodiment. FIGS. 7A, 7B, 7C, 7D, 7E, 7F, and 7G will be referred to together here.

Figure 7A:
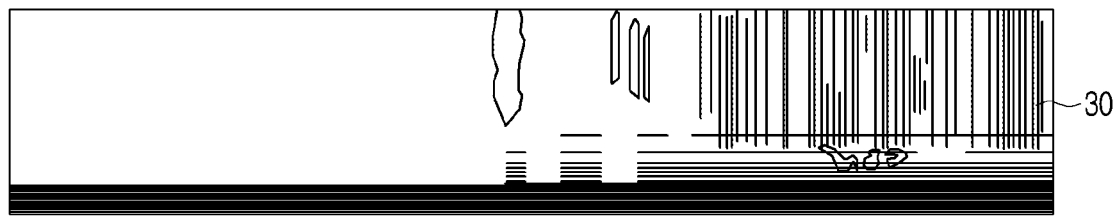
FIGS. 7A, 7B, 7C, 7D, 7E, 7F, and 7G are diagrams for describing an example masking pattern according to various embodiments.

FIG. 7A illustrates a 2D feature map 30. As described above, the electronic device 100 may generate the 2D feature map 30 by generating partial feature maps for some regions of sound data and connecting the generated partial feature maps to each other. An X-axis of the 2D feature map 30 may be a time component and a Y-axis thereof may be a frequency component.

Figure 7B:
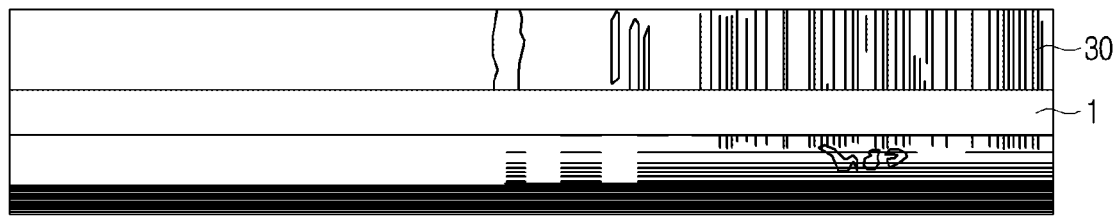
Figure 7C:
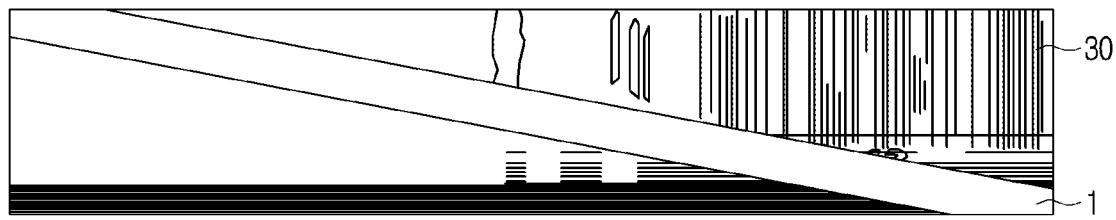
Figure 7D:
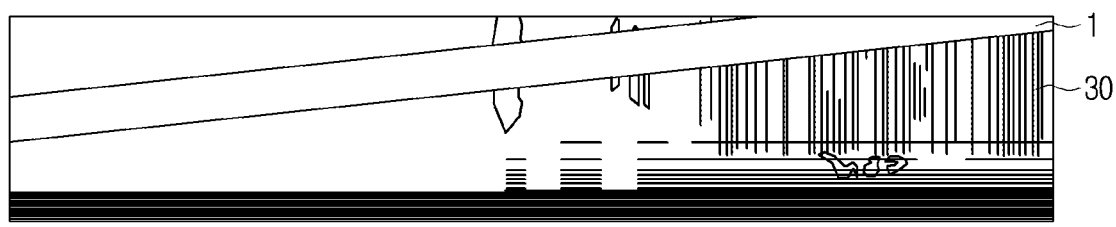
Figure 7E:
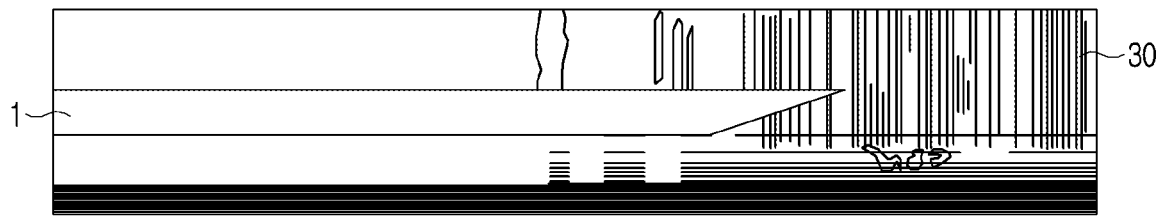
Figure 7F:
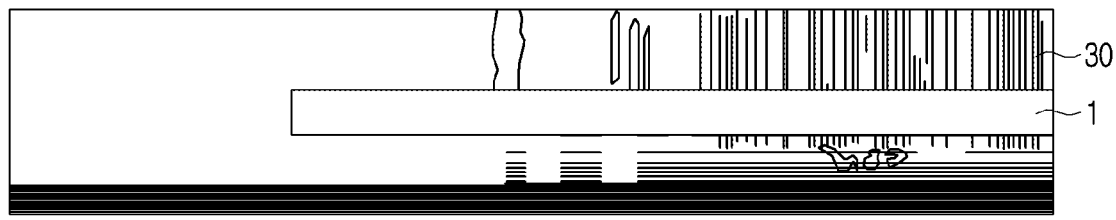

The electronic device 100 may generate various types of training data by masking a preset area of the 2D feature map. For example, FIG. 7B illustrates the 2D feature map 30 in which a certain frequency component is masked (1) over an entire time region. FIG. 7C illustrates the 2D feature map 30 masked (1) in a diagonal shape from an upper left end of the 2D feature map 30 to a lower right end thereof. FIG. 7D illustrates the 2D feature map 30 masked (1) in a diagonal shape from a left region to the upper right end. FIG. 7E illustrates the 2D feature map 30 masked (1) in a trapezoidal shape. FIG. 7F illustrates the 2D feature map 30 masked (1) in a rectangular shape from a certain point in time to a last point in time on the time axis.

Figure 7G:
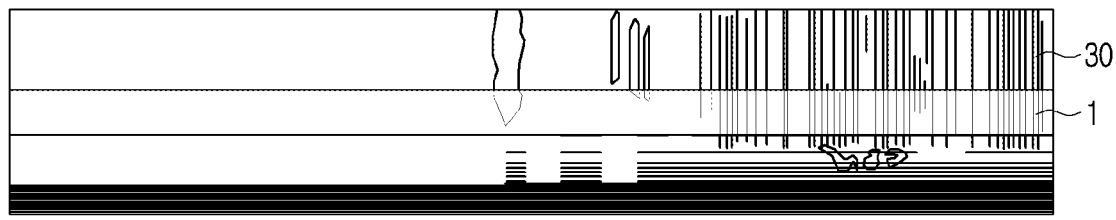

Data included in a masking regions illustrated in FIGS. 7B, 7C, 7D, 7E, and 7F may be 0. However, masking for changing values may be applied to a 2D feature map. FIG. 7G illustrates the 2D feature map 30 including a result of masking 1 similar to that of FIG. 7B. However, the data in a masking region of FIG. 7B is 0, whereas the data of a masking region of FIG. 7G may include a certain value. The masking regions of FIGS. 7B, 7C, 7D, 7E, 7F, and 7G are only examples and embodiments are not limited thereto. That is, examples of a masking region may include a region of a geometric shape that is long on the time axis, a region of a geometric shape that is long on the frequency axis, a diagonal region with a preset width, a region with a grid pattern, a data value changing region, etc.

The electronic device 100 may perform masking such that features of input sound data may be maintained. The electronic device 100 may mask a region of a 2D feature map, in which the amount (or area) of valid sound data is greater than a preset first level, at a preset first ratio. In addition, the electronic device 100 may mask a region of the 2D feature map, in which the amount of valid sound data is equal to or less than a predetermined second level, at a preset second ratio. The preset second ratio may be higher than the preset first ratio. For example, the electronic device 100 may set a masking region of the 2D feature map to be less than 50%. The electronic device 100 may mask a region of the 2D feature map, in which an area of valid sound data is empty for one second or more or the amount of valid sound data is less than 1 kHz, to 10% or more. Alternatively, the electronic device 100 may mask a region of the 2D feature map, in which an area of valid sound data lasts for 0.5 seconds or more or the amount of valid sound data is 1 kHz or more to be less than 10%. The electronic device 100 may variably mask the 2D feature map based on the amount (or area) of the valid sound data to generate various 2D feature maps including (or maintaining) features of the sound data.

Because the example electronic device 100 of the disclosure is capable of generating various types of training data from a piece of sound data, a large amount of training data may be generated from a small amount of sound data and the precision of a neural network model that recognizes sound may be increased.

Figure 8:
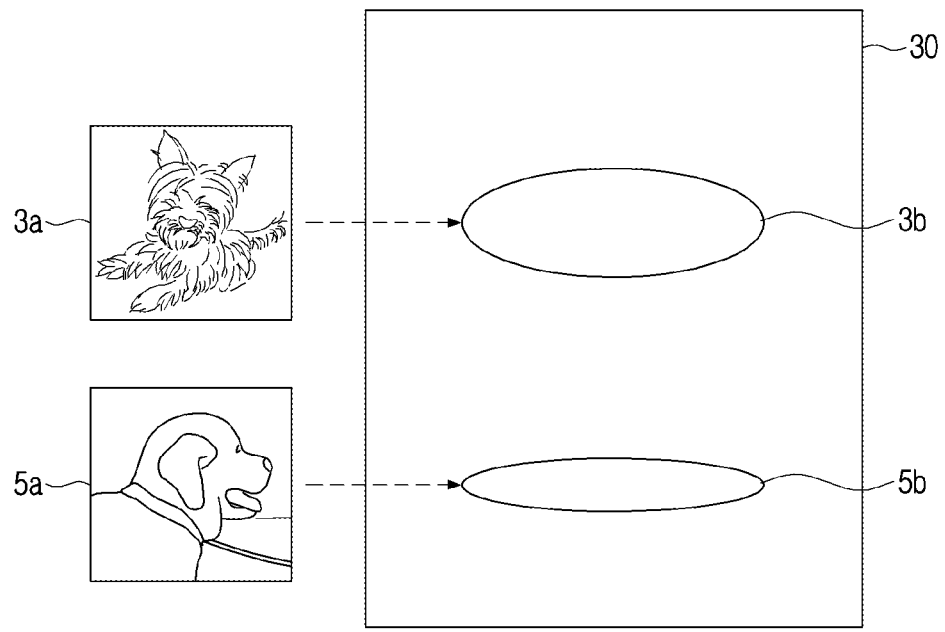
FIG. 8 is a diagram for describing an example process of identifying the type of sound based on a 2D feature map according to various embodiments.

FIG. 8 is a diagram for describing an example process of identifying the type of sound based on a 2D feature map according to an embodiment.

FIG. 8 illustrates a 2D feature map 30 including a first sound feature 3b and a second sound feature 5b. An X-axis of the 2D feature map 30 may be a time component and a Y-axis thereof may be a frequency component. Thus, a first sound feature 3b and a second sound feature 5b may be features related to sound generated in the same time zone. However, the first sound feature 3b may include a frequency component higher than that of the second sound feature 5b.

For example, when the first sound feature 3b and the second sound feature 5b are features related to dog barking, the first sound feature 3b may be a feature of a bark of a small dog 3a and the second sound feature 5b may be a feature of a bark of a large dog 5a. Alternatively, when the first sound feature 3b and the second sound feature 5b are related to voice, the first sound feature 3b may be a feature of voice of a child or woman and the second sound feature 5b may be a feature of voice of an adult or a man.

The electronic device 100 of the disclosure is a sound recognition device. Recognizing sound is different from recognizing voice. That is, sound recognition is understood, for example, as identifying the type of sound or a place in which the sound has occurred, and voice recognition is understood, for example, as further including recognizing the meaning of the voice.

For example, when a man utters "Turn on the light", the uttered content "Turn on the light" is identified through voice recognition but the man's voice is identified through sound recognition rather than the uttered content. That is, sound of a wind, a child's cry, dog barking, and the like are ignored as noise or meaningless sound in voice recognition, but the type of each sound or a surrounding environment may be identified in sound recognition.

Accordingly, various types of training data as described above cannot be generated through voice recognition. For example, sound recognition allows features of sound to be identified and thus the type of the sound data may be identified from a feature map generated by performing hopping by a hop length or a feature map to which various forms of masking are applied. However, voice recognition allows the meaning of voice to be identified and thus the exact meaning of the voice cannot be identified by hopping sound data or applying masking.

Meanwhile, the electronic device 100 may recognize personalized sound. Personalized sound recognition may be understood as identifying an object that generates the sound.

Figure 9:
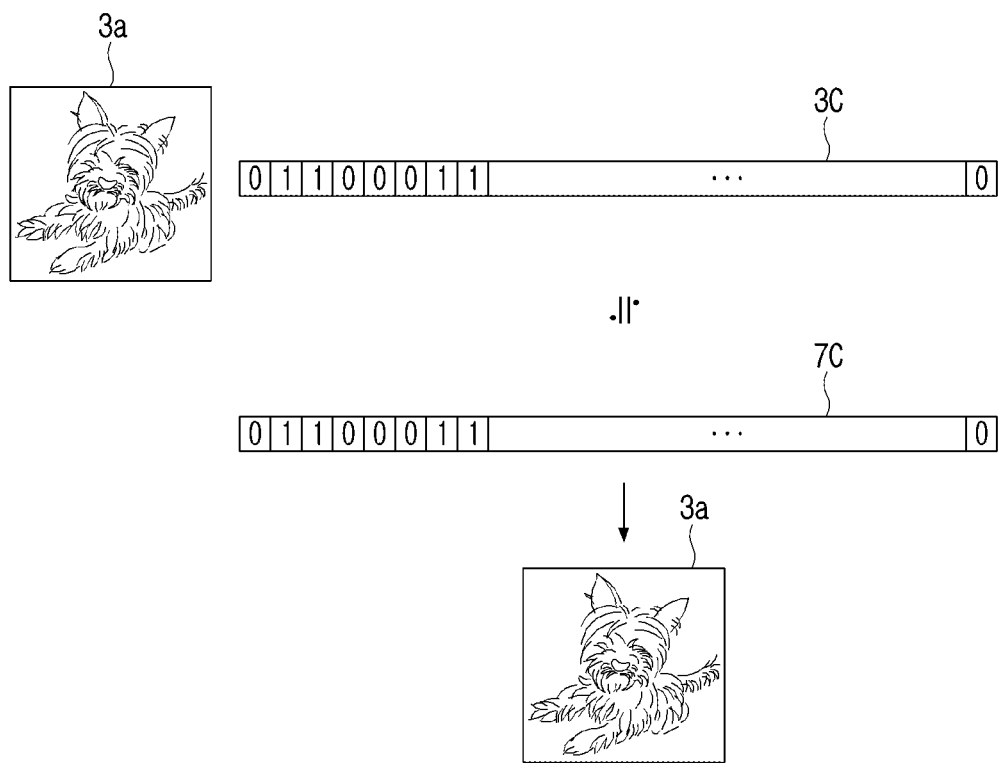
FIG. 9 is a diagram for describing example personalized sound recognition according to various embodiments.

FIG. 9 is a diagram for describing example personalized sound recognition according to various embodiments.

Referring to FIG. 9, a bark of a first small dog 3a may be input to the electronic device 100. The electronic device 100 may perform FFT on the input bark of the first small dog 3a to generate a 2D feature map. The electronic device 100 may identify a first feature vector 3c from a 2D feature map input using a trained sound recognition neural network model and recognize sound. Next, the electronic device 100 may store the identified first feature vector 3c.

Thereafter, the electronic device 100 may receive a bark of a dog and identify a second feature vector 7c in the same manner using the trained sound recognition neural network model. The electronic device 100 may compare the identified second feature vector 7c with the stored first feature vector 3c. For example, the electronic device 100 may determine a similarity between vectors using a method such as cosine similarity, Euclidean similarity, or vector similarity. As a result of the comparison, the electronic device 100 may determine that the second feature vector 7c is similar to the first feature vector 3c. The electronic device 100 may recognize that the received bark of a dog as the bark of the first small dog 3a.

Various examples of sound recognition have been described above. A flowchart of a sound recognition method will be described below.

Figure 10:
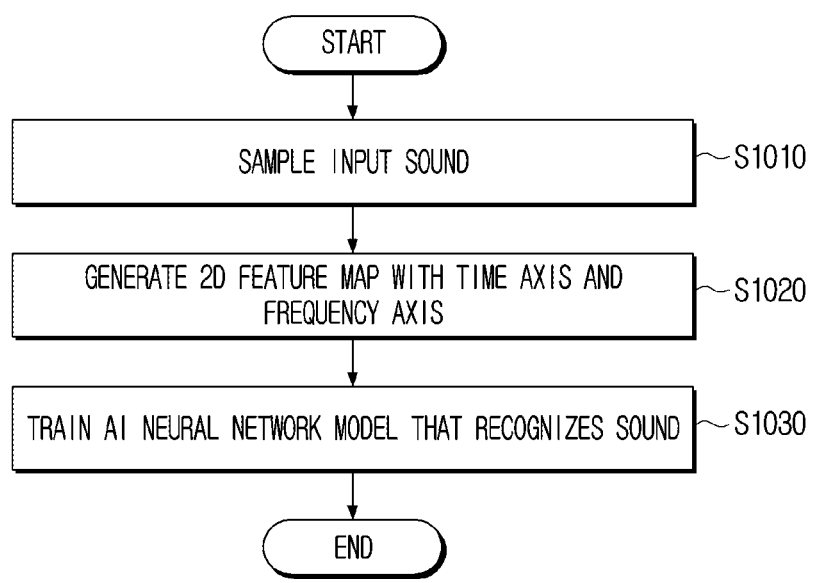
FIG. 10 is a flowchart of an example sound recognition method according to various embodiments.

FIG. 10 is a flowchart of an example sound recognition method according to various embodiments.

Referring to FIG. 10, an electronic device receives input sound and samples the input sound based on a preset sampling rate (S1010). The electronic device generates a 2D feature map (with time axis and frequency axis) from the sampled input sound (S1020). The electronic device may perform FFT on the sampled input sound based on at least one of random FFTs or random hop lengths, and generate a 2D feature map with a time axis and a frequency axis from the sampled input sound on which FFT is performed.

For example, the electronic device may transform the sampled input sound into first FFT data based on at least one of a first FFT number among the random FFT numbers and a first hop length among the random hop lengths, and generate a first 2D feature map including a first feature from the first FFT data. In addition, the electronic device may transform the sampled input sound into $n^{th}$ FFT data based on at least one of an $n^{th}$ FFT number among random FFT numbers or an $n^{th}$ hop length among random hop lengths, and generate an $n^{th}$ 2D feature map including an $n^{th}$ feature from the $n^{th}$ FFT data.

The electronic device may perform FFT on a sound part of a first time corresponding to a preset number of samples to generate a first partial feature map. In addition, the electronic device may generate a second partial feature map by performing FFT on a sound part of a second time consecutive to the first time and corresponding to the preset number of samples. The electronic device may generate an $n^{th}$ partial feature map by repeatedly performing the above process, i.e., performing FFT on a sound part of an $n^{th}$ time consecutive to an ($n^{th}$-1) time and corresponding to the preset number of samples. The electronic device may connect the first partial feature map, the second partial feature map, and the $n^{th}$ partial feature map to generate a 2D feature map.

In S1030, the electronic device may train a neural network model, which recognizes sound, with a plurality of 2D feature maps including the first 2D feature map and the $n^{th}$ 2D feature map as training data.

For example, the electronic device may determine the amount of data on the frequency axis according to a random FFT number. In addition, the electronic device may change a resolution of the frequency axis of the 2D feature map on the random FFT number. An FFT number may be a frequency resolution. The electronic device may generate various 2D feature maps from the same input sound data according to various FFT numbers and train a neural network model with the various 2D feature maps as a plurality of pieces of training data.

Alternatively, the electronic device may generate a plurality of 2D feature maps by hopping the number of samples corresponding to a random hop length m times, and train the neural network model with the plurality of 2D feature maps as a plurality of pieces of training data. The electronic device may change a resolution of the time axis of the 2D feature map based on the random hop length.

In addition, the electronic device may mask a preset region of the 2D feature map. For example, the electronic device may mask a region of a generated 2D feature map, in which the amount of sound data is greater than a preset first level, at a preset first ratio and mask a region of the 2D feature map, in which the amount of sound data is equal to or less than a preset second level, at a preset second ratio. The preset second ratio may be higher than the preset first ratio. Examples of the masked preset region may include a region of a geometric shape that is long on the time axis, a region of a geometric shape that is long on the frequency axis, a diagonal region with a preset width, a region with a grid pattern, etc. The electronic device may mask different regions of a plurality of 2D feature maps and train a neural network model, which recognizes sound, with the plurality of 2D feature maps on which different regions are masked as a plurality of pieces of training data.

The electronic device may recognize sound using the trained neural network model. For example, the electronic device may receive sound to be recognized. The electronic device may generate a 2D feature map to be recognized from the input sound. The electronic device may recognize the sound by inputting the generated 2D feature map to the trained neural network model.

The electronic device may recognize the type of the sound and a place in which the sound has been generated. For example, the electronic device may recognize the type of the sound, e.g., the sound of waves or vehicle horn sound, etc., and a place in which the sound has occurred, e.g., downtown, indoors or a beach.

In addition, the electronic device may identify a subject who generates the sound (personalized sound recognition) using the trained neural network model.

For example, in the above-described sound recognition process, the electronic device may identify a first feature vector of input sound. When another sound to be recognized is input, the electronic device may identify a second feature vector of the other sound. The electronic device may compare the first feature vector and the second feature vector with each other to identify whether the input sound and the other sound to be recognized have been generated from the same subject (or the same source or sound source).

Figure 11:
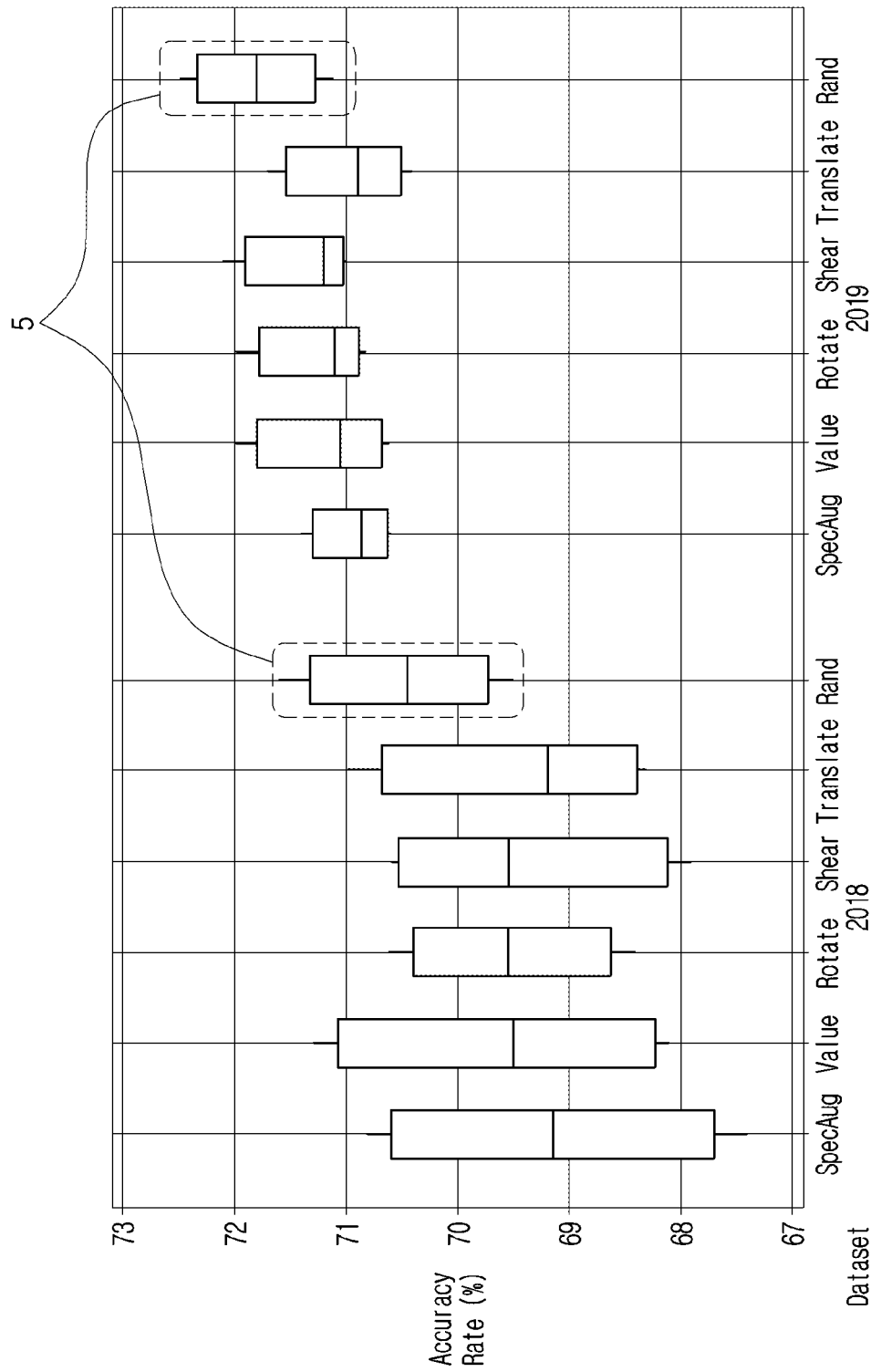
FIG. 11 is a diagram for describing example sound recognition performance according to various embodiments.

FIG. 11 is a diagram for describing example sound recognition performance according to various embodiments.

FIG. 11 illustrates sound recognition performance according to various methods. FIG. 11 shows that sound recognition performance 5 according to the disclosure is better than sound recognition performance according to another method.

Effects of the disclosure are not limited thereto, and other effects that are not described herein will be apparent to those of ordinary skill in the art from the above description.

The sound recognition methods according to the various embodiments described above may be provided through a computer program product. The computer program product may be a software (S/W) program or may include a non-transitory computer-readable medium storing the S/W program.

The non-transitory computer-readable medium may be understood, for example, as a medium that stores data semi-permanently and that is readable by a machine rather than a medium, e.g., a register, a cache or a memory, that stores data for a short time. Specifically, various applications or programs as described above may be provided by being stored in a non-transitory computer-readable recording medium such as a CD, a DVD, a hard disk, a Blu-ray disk, a USB, a memory card, a ROM, or the like.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A sound recognition method comprising:
   sampling input sound based on a preset sampling rate; and
   performing Fast Fourier Transform (FFT) on the sampled input sound based on at least one of random FFT numbers or random hop lengths, and generating a two-dimensional (2D) feature map, with a time axis and a frequency axis, from the sampled input sound on which FFT is performed,
   wherein the generating of the 2D feature map comprises:
      transforming the sampled input sound into first FFT data based on at least one of a first FFT number among the random FFT numbers or a first hop length among the random hop lengths, generating a first 2D feature map including a first feature from the first FFT data, transforming the sampled input sound into $n^{th}$ FFT data based on at least one of an $n^{th}$ FFT number among the random FFT numbers and an $n^{th}$ hop length among the random hop lengths, and generating an $n^{th}$ 2D feature map including an $n^{th}$ feature from the $n^{th}$ FFT data, where n is greater than 1; and
      training a neural network model, which recognizes sound, with a plurality of 2D feature maps including the first 2D feature map and the $n^{th}$ 2D feature map as training data.

2. The sound recognition method as claimed in claim 1, wherein the generating of the 2D feature map further comprises performing FFT on a sound part of a first time corresponding to a preset number of samples to generate a first partial feature map, performing FFT on a sound part of a second time consecutive to the first time and corresponding to the preset number of samples to generate a second partial feature map, performing FFT on a sound part of an $n^{th}$ time consecutive to an ($n^{th}$−1) time and corresponding to the preset number of samples to generate an $n^{th}$ partial feature map, and connecting the first partial feature map, the second partial feature map, and the $n^{th}$ partial feature map to one another.

3. The sound recognition method as claimed in claim 1, wherein the generating of the 2D feature map further comprises determining an amount of data on the frequency axis according to the random FFT numbers.

4. The sound recognition method as claimed in claim 1, wherein the generating of the 2D feature map further comprises changing a resolution of the frequency axis of the 2D feature map based on the random FFT numbers.

5. The sound recognition method as claimed in claim 1, wherein the generating of the 2D feature map further comprises generating a plurality of 2D feature maps including different features from each other by hopping the number of samples corresponding to the random hop lengths m times, and
   the training of the neural network model comprises training the neural network model using the plurality of 2D feature maps as a plurality of pieces of training data.

6. The sound recognition method as claimed in claim 5, wherein the generating of the 2D feature map comprises changing a resolution of the time axis of the 2D feature map based on the random hop lengths.

7. The sound recognition method as claimed in claim 1, further comprising masking a preset region of the 2D feature map.

8. The sound recognition method as claimed in claim 7, wherein the masking of the preset region of the 2D feature map comprises masking a region of the generated 2D feature map in which an amount of valid sound data is greater than a preset first level at a preset first ratio, and masking a region of the generated 2D feature map in which an amount of valid sound data is equal to or less than a preset second level at a preset second ratio, wherein the preset second ratio is higher than the preset first ratio.

9. The sound recognition method as claimed in claim 7, wherein the masked preset region comprises at least one of a region of a geometric shape that is long on the time axis, a region of a geometric shape that is long on the frequency axis, a diagonal region with a preset width, or a preset region with a grid pattern.

10. The sound recognition method as claimed in claim 7, wherein the masking of the preset region of the 2D feature map comprises masking different regions of the plurality of 2D feature maps, and
    the training of the neural network model comprises training a neural network model, which recognizes sound, with the plurality of 2D feature maps, in which the different regions are masked, as a plurality of pieces of training data.

11. The sound recognition method as claimed in claim 1, further comprising:
    receiving first sound to be recognized;
    generating a 2D feature map to be recognized from the received first sound based on a preset FFT number and a preset hop length; and
    recognizing the sound by inputting the generated 2D feature map to a trained neural network model.

12. The sound recognition method as claimed in claim 11, wherein the recognizing of the sound comprises recognizing at least one of a type of the sound or a place in which the sound is generated.

13. The sound recognition method as claimed in claim 11, further comprising:
    identifying a first feature vector of the received first sound to be recognized;

identifying a second feature vector of second sound to be recognized when the second sound is input; and comparing the first feature vector and the second feature vector with each other to identify whether the second sound is generated from the same source as the first sound.

14. An electronic device comprising:

an input interface; and at least one processor, wherein the at least one processor is configured to:

sample sound input through the input interface based on a preset sampling rate;

perform Fast Fourier Transform (FFT) on the sampled input sound based on at least one of random FFT numbers or random hop lengths, and generate a two-dimensional (2D) feature map with a time axis and a frequency axis from the sampled input sound on which FFT is performed;

transform the sampled input sound into first FFT data based on at least one of a first FFT number among the random FFT numbers or a first hop length among the random hop lengths, generate a first 2D feature map including a first feature from the first FFT data, transform the sampled input sound into $n^{th}$ FFT data based on at least one of an $n^{th}$ FFT number among the random FFT numbers and an $n^{th}$ hop length among the random hop lengths, and generate an $n^{th}$ 2D feature map including an $n^{th}$ feature from the $n^{th}$ FFT data, wherein n is greater than 1; and train a neural network model, which recognizes sound, with a plurality of 2D feature maps including the first 2D feature map and the $n^{th}$ 2D feature map as training data.

15. The electronic device as claimed in claim 14, wherein the at least one processor is further configured to perform FFT on a sound part of a first time corresponding to a preset number of samples to generate a first partial feature map, perform FFT on a sound part of a second time consecutive to the first time and corresponding to the preset number of samples to generate a second partial feature map, perform FFT on a sound part of an $n^{th}$ time consecutive to an $(n^{th}-1)$ time and corresponding to the preset number of samples to generate an $n^{th}$ partial feature map, and connect the first partial feature map, the second partial feature map, and the $n^{th}$ partial feature map to one another to generate the 2D feature map.

* * * * *